Aug. 28, 1956 W. H. WIRKLER 2,761,062

CARRIER-SENSING ANTI-NOISE RECEIVING SYSTEM

Original Filed Dec. 9, 1947 5 Sheets-Sheet 1

Inventor
WALTER H. WIRKLER
John J. Rogan
Attorney

CARRIER-SENSING ANTI-NOISE RECEIVING SYSTEM

Original Filed Dec. 9, 1947 5 Sheets-Sheet 2

Inventor
WALTER H. WIRKLER
BY John J. Rogan
Attorney

Aug. 28, 1956 W. H. WIRKLER 2,761,062

CARRIER-SENSING ANTI-NOISE RECEIVING SYSTEM

Original Filed Dec. 9, 1947 5 Sheets-Sheet 3

Inventor
WALTER H. WIRKLER
BY John J. Rogan
Attorney

CARRIER-SENSING ANTI-NOISE RECEIVING SYSTEM

Original Filed Dec. 9, 1947 5 Sheets-Sheet 4

Inventor
WALTER H. WIRKLER
By John J. Rogan
Attorney

CARRIER-SENSING ANTI-NOISE RECEIVING SYSTEM

Original Filed Dec. 9, 1947 5 Sheets-Sheet 5

Inventor
WALTER H. WIRKLER
By John J. Rogan
Attorney 2,761,062

CARRIER-SENSING ANTI-NOISE RECEIVING SYSTEM

Walter H. Wirkler, Cedar Rapids, Iowa, assignor to Collins Radio Company, Cedar Rapids, Iowa, a corporation of Iowa Original application December 9, 1947, Serial No. 790,501, now Patent No. 2,580,148, dated December 25, 1951. Divided and this application November 23, 1951, Serial No. 258,481

7 Claims. (Cl. 250—20)

This invention relates to signal detector arrangements and more particularly to systems employing high frequency carriers.

A principal object of the invention is to provide a signal or control voltage responsive circuit which is operative in the presence of relatively strong noise voltages, but which is prevented from false operation by the noise voltage itself.

Another object is to provide a signal voltage responsive circuit which responds to a substantially steady intelligence or control signal, and which is substantially non-responsive to random noise voltages in themselves.

A further object is to provide an improved signal responsive circuit which depends for its proper control or intelligence action, upon the presence of a received carrier, and which is protected against false operation by random noise voltages in the absence of received carrier.

Another object is to provide a signal receiving system of the "carrier-off" detection type, wherein false operation by random noise voltage is prevented by employing a product detector which is fed by two input branches one of which has a greater time delay than the other; the two branches are arranged to be supplied in parallel with the received voltages. The time delay of one branch is coordinated with respect to the other branch so that substantially coincident carrier voltages or similar substantially steady signals are necessary in both branches in order to produce a rectified control signal in the detector output.

A feature of the invention relates to a system which is responsive to a steady intelligence or control signal and substantially non-responsive to random noise voltages, employing a product detector having two input branches with predetermined and relative transmission delays, and a single output circuit wherein detected output exists only when input energy is applied simultaneously over to said detector; the output circuit having means for selecting the uni-directional current representing the steady signals, while rejecting the alternating currents representing the noise.

Another feature relates to an improved "carrier-off" and noise discriminator arrangement employing a coincident detector of the electro-mechanical transducer type.

A further feature relates to a "carrier-off" and noise discriminator arrangement employing two product or coincidence detectors each of which has a pair of input branches and a common output circuit. The corresponding ones of each of said pairs of input branches are time delayed a predetermined amount with respect to the remaining input branches, and the signal voltages applied to the two input branches of one detector differ by 90 electrical degrees from the relation which exists between the signal voltages applied to the two input branches of the other detector. Each detector has its output provided with special filter means, the output of the filters being connected for additive relation of the filtered uni-directional currents regardless of their relative polarities.

A further feature relates to a "carrier-off" and noise discriminator arrangement employing a coincidence or product detector which is arranged to be fed over separate paths by the received energy, one path having a predetermined time lag with respect to the other path, one of said paths including one or more stages tuned to the signal frequency.

A further feature relates to a carrier and noise discriminator arrangement employing a coincidence or product detector which is arranged to be fed over separate paths by the received energy of respectively different and predetermined time delay, one path including means to amplitude-modulate or phase-modulate the signal at a fixed frequency; the detector having an output circuit which includes filter means to accept components of said fixed frequency while rejecting components of frequencies appreciably different from said fixed frequency.

A still further feature relates to the novel organization, arrangement and relative interconnection of parts which cooperate to provide an improved carrier and noise discriminator system.

Other features and advantages not particularly enumerated will be apparent after a consideration of the following detailed descriptions and the appended claims.

In the drawing,

Fig. 1 is a generalized schematic diagram explanatory of the principles of the invention.

Figs. 2, 3, 4 and 4*a* are modifications of the product detector of Fig. 1.

Figure 1:
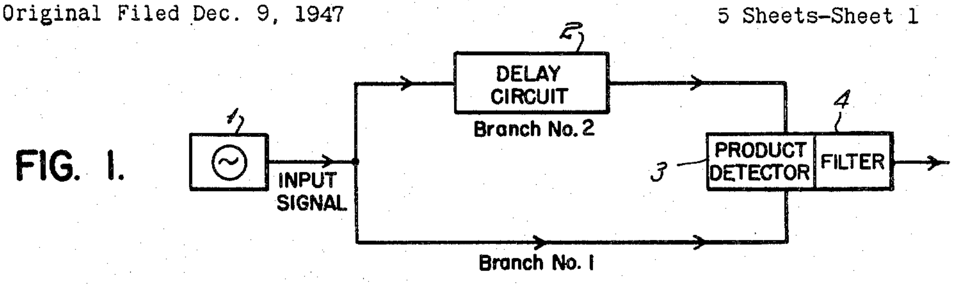

The basic principle of this invention is illustrated schematically in Fig. 1. The input signal from source 1 is split into two branches, one of which includes a delay circuit 2, and the two branches are recombined in a product detector 3 to produce an indicating voltage which, after suitable filtering in filter 4, appears at the output terminals. In the first branch, the signal is applied to the product detector with negligible time or amplitude distortion; in the second branch, however, the signal passes through the time delay means 2 which delays its arrival at the product detector.

The product detector or coincidence detector requires the presence of the signal in both branches simultaneously in order to produce an indicating voltage. Figs. 2, 3, 4 and 4*a* show various detector circuits suitable for product detection.

Figure 2:
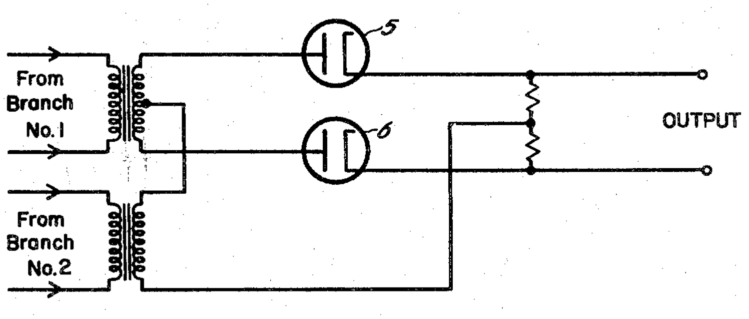
Figure 3:
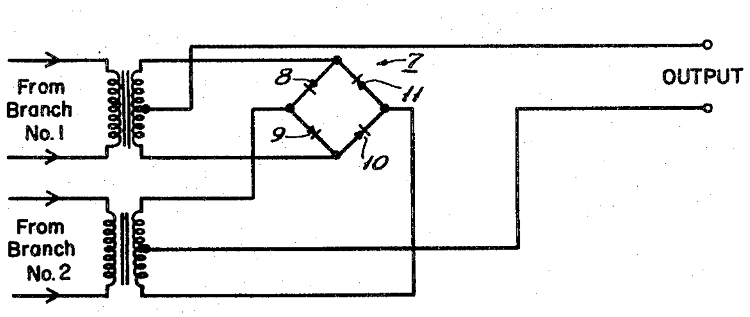
Figure 4:
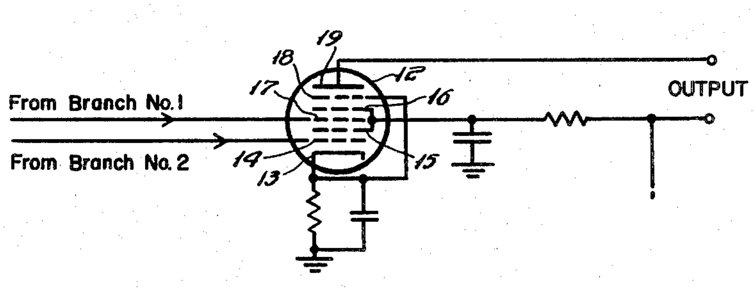

In Fig. 2, for example, it is obvious that there will be no direct current across the output of the balanced rectifier comprising diodes 5, 6, when signal is present in only one of the input branches. The same is true of the doubly-balanced ring rectifier 7 of Figure 3, which is constructed preferably of four semi-conducting elements 8, 9, 10, 11, with square law current-versus-voltage characteristics. The detector of Fig. 4 is a pentagrid converter tube 12 of the type commonly used as the first detector in conventional superheterodyne receiving circuits and is characterized by the fact that its output, like that of Fig. 3, contains components approximately proportional to the product of the instantaneous voltages applied to its two sets of input terminals. Tube 12 comprises the electron-emitting cathode 13, first control grid 14 which is fed from branch #2, shield grids 15, 16; second control grid 17 which is fed from branch #1, suppressor grid 18, and output plate or anode 19. Hence the term "product detector" will be used in this specification for convenience in designating any of these or similar detecting means which produce a characteristic output only when a signal is applied to each of two input circuits simultaneously. Such a detector is also known in the art as a coincidence detector having two input terminals both of which must be simultaneously energized before a signal appears in the output.

Figure 4A:
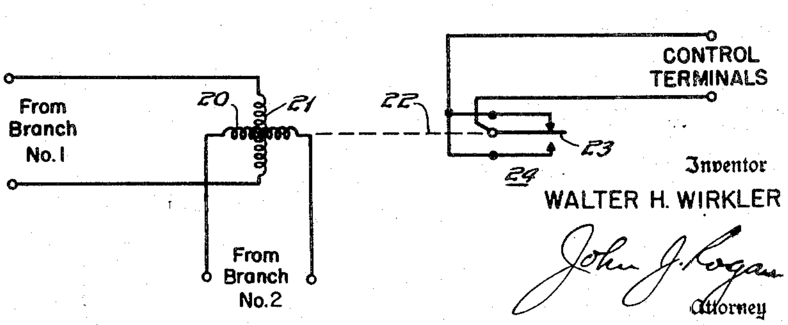

Fig. 4*a* shows a wattmeter movement of the electrodynamometer type used as a product detector, employing two dynamometer coils 20, 21, one of which may be stationary and the other a moving coil as is well-known in electrodynamometer type wattmeters. The moving coil 21 has attached thereto an arm 22 which operates the movable contact 23 of a single-pole double-throw switch 24. The torque produced by the instrument is proportional to the product of the current in the two coils, and the useful output due to a steady signal takes the form of uni-directional mechanical torque which can be utilized in various ways, such as closing electrical contacts, for example. The mechanical inertia of the instrument here serves to reject the effect of alternating torque produced by noise voltages. The signal here must be of relatively low frequency (audio) and the delay means may consist of electrical circuits, electromechanical or acoustical means, or phonograph recording and pickup heads displaced from each other along a moving recording medium.

It is now clear that a short noise impulse, being delayed in one branch of Fig. 1, cannot reach both input circuits of the product detector simultaneously and so produce a characteristic indicating voltage in the output, whereas a steady signal of longer duration can be present in both circuits simultaneously despite the delay in one branch. While this explanation of the non-response of the circuit to noise voltage is adequate when the noise consists of impulses of short duration and low recurrence rate, the circuit will be non-responsive also to random noise, which may consist of impulses closely spaced in time. Hence further explanation is required. For this purpose reference may be had to Fig. 5.

Figure 5:
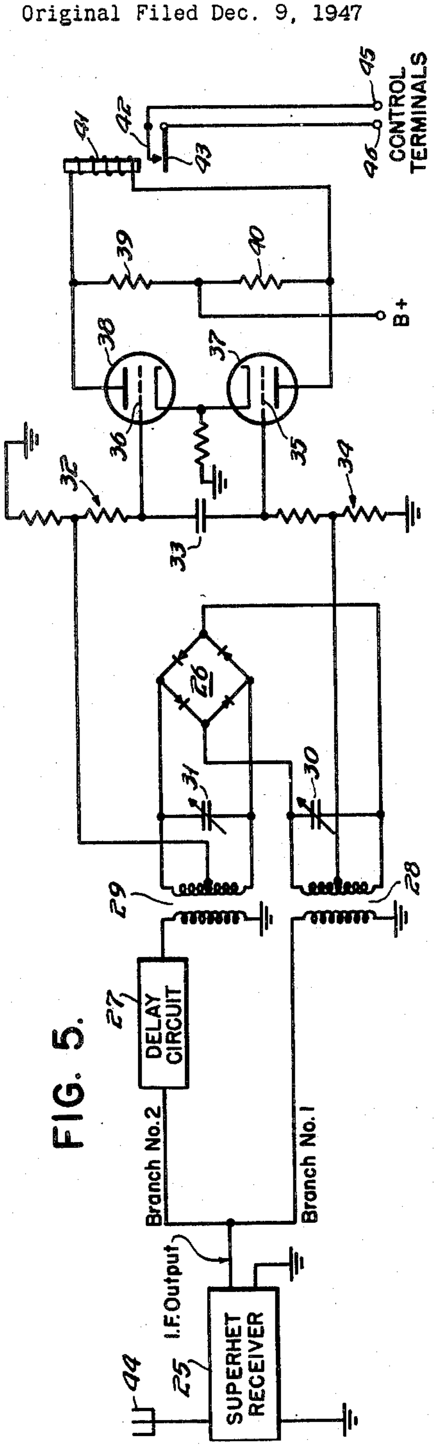
Figs. 5, 6, 7 and 8 are respective modifications of the system of Fig. 1.

In Fig. 5, the intermediate frequency output of a superheterodyne receiver 25 is applied to product detector 26 directly through branch 1 and through time-delay circuits 27 in branch 2, by respective coupling transformers 28, 29, tuned to the intermediate frequency by respective condensers 30, 31. A steady signal may produce direct current in the output of 26, which is passed through resistance-capacitance filters 32, 33, 34, to remove alternating current components, and the uni-directional output of the filters is applied to the control grids 35, 36 of D. C. amplifier tubes 37, 38. Any D. C. potential across these grids will cause a differential D. C. current in the plate resistors 39, 40 to operate relay 41, the contacts 42, 43 of which may close the circuit to a loud-speaker, telegraph sounder or tell-tale lamp, connected to control terminals 45, 46, for example. For simplicity, we shall assume that the selectivity characteristics of the receiver are equivalent to those of a single very selective circuit, but this is not essential to the operation of the system. A noise impulse at the antenna 44 may then produce an I. F. output voltage described as a function of time by:

$$v_n = V_n e^{-at} \cos \omega_0 t \qquad (1)$$

where $v_n$ is the instantaneous noise voltage, $V_n$ the peak noise voltage; $a$ is the decrement of the circuit which is proportional to the effective bandwidth; $e^{-at}$ is the decrement factor showing how the amplitude of the oscillation decays with time and $\cos \omega_0 t$ is the oscillation factor; $\omega_0$ is the cyclic natural frequency of the I. F. selective circuit; and $t$ is the time since the impulse was applied to the antenna. If $d$ is the time delay in branch #2, the delayed noise voltage is given by:

$$v_n' = V_n e^{-a(t-d)} \cos \omega_0 (t-d) \qquad (2)$$

or $$v_n' = V_n e^{-a(t-d)} \cos (\omega_0 t - \phi_n)$$

where $$\phi_n = \omega_0 d$$

is the phase angle between the oscillation factors of the direct and the delayed noise voltages. The output of 26 will then be a pulse of direct current determined from $$(v_n)(v_n') = V_n^2 e^{-2at-ad} \cos \omega_0 t \cos (\omega_0 t - \varphi n) \qquad (3)$$

The product of the two cosine terms in (3) contains a D. C. term proportional to ½ cos $\varphi n$, in addition to the various A. C. terms. If the time constant of circuit 32, 33, 34, is very great, only the D. C. component can cause operation of the relay. The magnitude of the D. C. component is proportional to $$\text{Noise D.C.} = \int_0^{00} \tfrac{1}{2} V_n^2 \cos \phi_n e^{-ad-2at} dt \qquad (4)$$

For comparison, if there had been no delay in branch #2, the D. C. output due to noise would have been $$\int_0^{00} \tfrac{1}{2} V_n^2 e^{-2at} dt \qquad (5)$$

The ratio of the two is then $$\frac{\text{D.C. output with delay}}{\text{D.C. output without delay}} = e^{-ad} \cos \phi_n = e^{-ad} \cos \omega_0 d \qquad (6)$$

The delay is thus effective in reducing the D. C. output due to noise by the factor $e^{-ad}$, modified by the factor $\cos \omega_0 d$.

A similar analysis will show that the D. C. output due to a signal is proportional to the square of the signal strength and the factor $\cos \omega_0 d$, without the factor $e^{-ad}$, if the signal wave is undamped and its frequency is equal to the natural frequency of the I. F. selective circuit. If the delay were such that $\cos \omega_0 d = 0$, or $\omega_0 d = \pi/2$, there would be no D. C. output due to either noise or signal. This would be the case if the delay amounted to a quarter cycle at the mid-frequency of the receiver passband, and if the signal frequency were centered in the passband. In general, then, discrimination against the effect of noise is obtained only by reduction of the factor $e^{-ad}$ in Equation 6. The greater the factor $a$, the shorter is the effective duration of a noise pulse in the output of the receiver. Thus a large reduction in the effect of noise is obtained when the delay $d$ is large compared to the effective duration of the pulse. In particular, it can be shown that the effective noise bandwidth of the receiver in cycles per second is $B = a/2$. Thus, for example, if B were 11,500 C. P. S., $a$ would be 23,000. If the delay were 1/10,000 of a second, the factor $ad$ would be 2.3, and the D. C. due to noise would be reduced by the factor $e^{-2.3}$, or to 1/10 as much as there would have been without the delay network.

The analysis so far has been concerned only with the interaction in the product detector of the direct and the delayed pulse due to the same applied noise impulse. We have seen that if the delay is great compared to the reciprocal of the bandwidth, the direct pulse will have decayed to a negligible value when the delayed pulse arrives, and the output of the product detector will be negligible. When the time separation of successive impulses is comparable with the delay, however, it is obvious that the direct pulse will interact with the delayed pulse from an earlier applied impulse and the detector output will not be zero. The detector output will then be given by an equation similar to (6) with $d$ replaced by the difference between the delay and the time separation of the impulses. The sign of the cosine factor in Equation 6 will thus be random because of the random separation of the impulses which characterizes random noise, so that the long-term average D. C. output of detector 26, Fig. 5, will be zero. The filter 32, 33, 34, is required to apply the averaging or integrating process to the output of detector 26 and to reject other than D. C. products.

Figure 6:
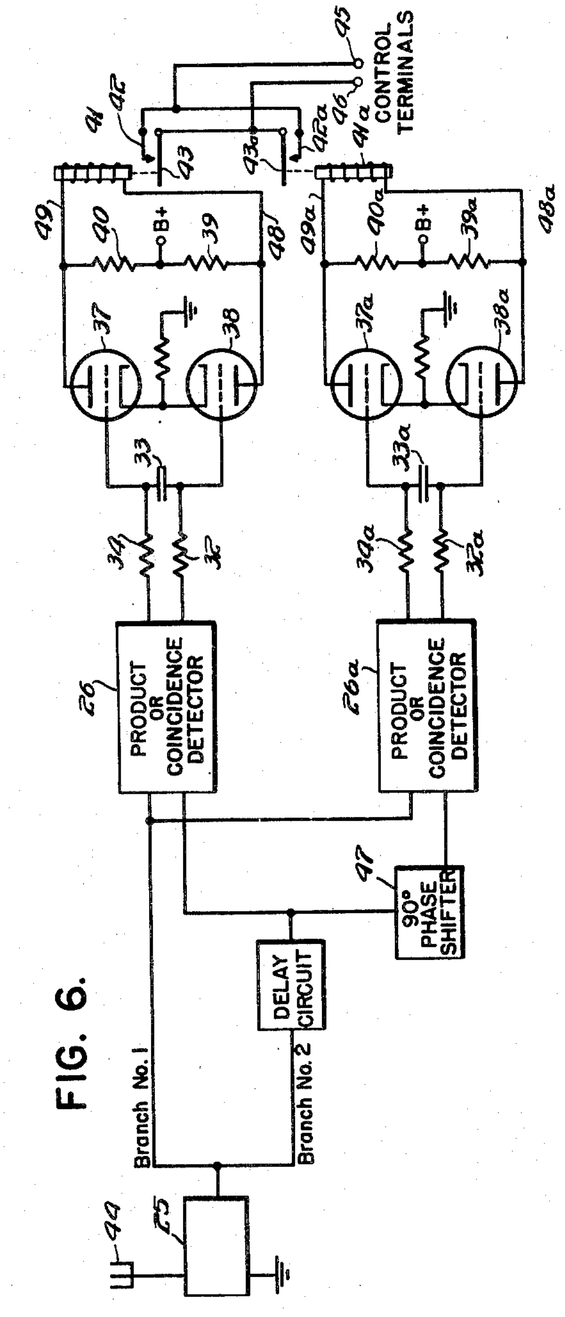

The D. C. output of the product detector due to the presence of the signal is proportional to $$\text{Signal D. C.} = V_s^2 \cos \omega_s d \qquad (7)$$

where $V_s$ and $\omega_s$ are the strength and the cyclic frequency of the signal, respectively. If the delay, *d*, remains constant and the I. F. signal frequency varies over a small range due to oscillator frequency drift in the transmitter or the receiver, the factor $\omega_s d$ may assume any value so that $\cos \omega_0 d$ may be positive, negative, or zero. To assure operation of the circuit regardless of these changes in signal frequency, the arrangement of Fig. 6 may be used wherein a second product detector **26*a* is provided, with a 90° electrical phase shifting network 47 applied in one of its input circuits, as shown in Fig. 6. It will be seen in Fig. 6 that the branch #1 is connected in parallel with detectors 26 and 26*a*, and likewise branch #2 is connected in parallel with detectors 26 and 26*a*, the last-mentioned connection including the 90° phase shifter 47. The detector 26 feeds into a filter 32, 33, 34, and thence into the D. C. amplifier tubes 37, 38, as in Fig. 5. Likewise, the second product detector 26*a* feeds into a similar filter 32*a*, 33*a*, 34*a*, and thence into similar D. C. amplifier tubes 37*a*, 38*a*. The differential output across plate resistors 39, 40, is applied over conductors 48, 49, to the winding of electro-magnetic relay 41. Likewise, the differential output across plate resistors 39*a*, 40*a*, is applied over conductors 48*a*, 49*a*, to the winding of an electromagnetic relay 41*a*. These relays have their respective contacts connected in parallel to the control terminals 45, 46.**

The D. C. output of **26*a*** due to the signal is thus $$\text{Signal D. C.} = V_s^2 \sin \omega_s d \qquad (8)$$

Figure 7:
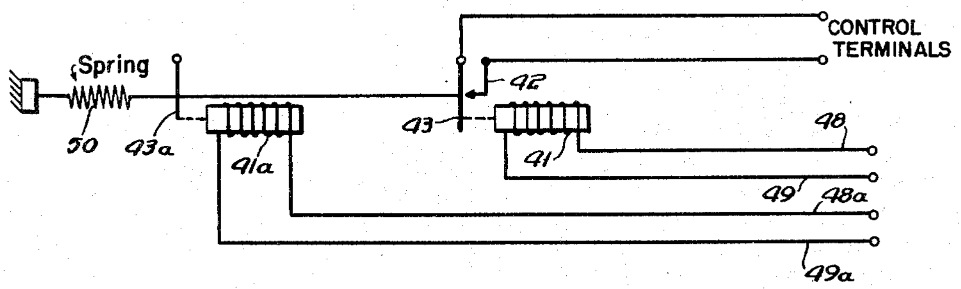

This is filtered by another R-C filter **32*a*, 33*a*, 34*a*, and applied through tubes 37*a*, 38*a*, to relay 41*a*.** Hence if $$\omega_s d = \frac{\pi}{2}$$

so that the output of 26 is zero, there will be maximum output from **26*a* and the contacts of either 41 or 41*a* or both, which are in parallel, will be closed whenever a signal is present regardless of its exact frequency and the phase angle of the factor $\omega_s d$. In fact, if the armatures 43 and 43*a* were linked together mechanically as in Fig. 7, pulling against a common retractile spring 50,** the sensitivity of this composite relay would be quite independent of $\omega_s d$, since the pull of each relay is proportional to the square of the signal current it receives.

Hence the total pull would be proportional to $$V_s^2(\cos^2 \omega_s d + \sin^2 \omega_s d) = V_s^2 \qquad (9)$$

Figure 8:
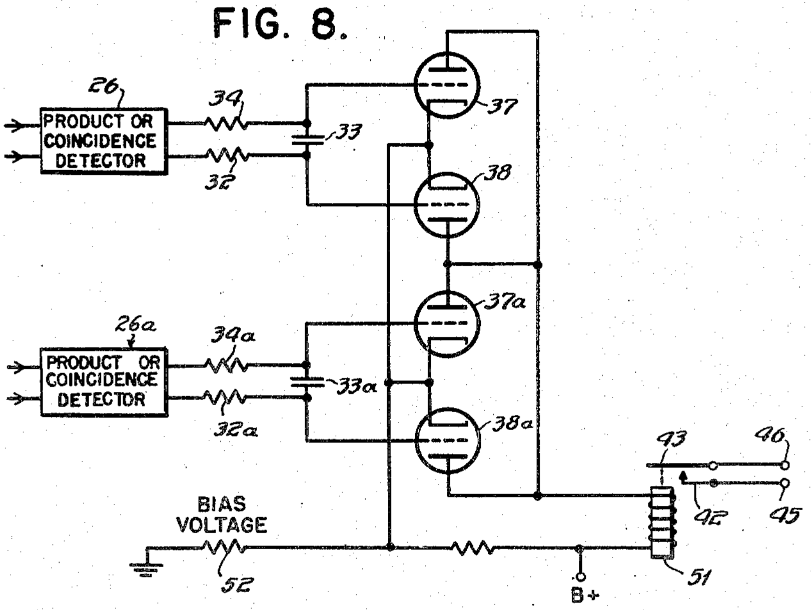

A similar effect can be realized from the circuit of Fig. 8 using a single relay 51 in which the tubes **37, 38, 37*a*, 38*a*, are biased by a D. C. bias means such as cathode resistor 52, to operate on the square law portion of their plate-current versus grid-voltage characteristic and the relay 51** receives the sum of the plate currents of all four tubes.

For simplicity, the analysis thus far has been based on the assumption that the intermediate frequency delay network applies the same delay and attenuation to all frequency components; i. e., that it has no phase or amplitude distortion. In practice, this requirement is not essential, as will be seen from an analysis of the circuit of Fig. 9.

Here the intermediate frequency signal from the superheterodyne radio receiver 25 passes through similar resonant circuits 53, 54 and 55 in a cascade amplifier comprising for example amplifier tubes 56, 57, 58. The signal from branch #1 is applied to one set of input terminals of a product detector 26, and that from branch #2 is applied to another product detector **26*a*. The remaining elements which are connected to the output of the product detectors may be the same as the corresponding numbered elements shown in Fig. 8. The additional delay required in branch #2 is furnished by circuits 54 and 55.**

If the equation of the transient oscillation across circuit 53 due to the application of a noise impulse is given by $$V_{53} = V_n e^{-at} \cos \omega_0 t \qquad (10)$$

and if, for simplicity, the signal gain of each stage is taken equal to unity, the transient oscillation across circuit 54 will be $$V_{54} = aV_n t e^{-at} \cos \omega_0 t \qquad (11)$$

and that across circuit 55

$$V_{55} = \frac{a^2 V_n}{2} t^2 e^{-at} \cos \omega_0 t \qquad (12)$$

The D. C. output of the product detector due to a single noise impulse will thus be proportional to $$\text{Noise D.C.} = \int_0^{\infty} V_{53} V_{55} dt \qquad (13)$$

$$= \frac{a^2 V_n^2}{2} \int_0^{\infty} t^2 e^{-at} \cos^2 \omega_0 t dt \qquad (14)$$

Since $\cos^2 \omega_0 t = \frac{1}{2} + \frac{1}{2} \cos^2 \omega_0 t$ of which only the term ½ contributes to the definite integral of Equation 14, this may be written $$\text{Noise D.C.} = \frac{a^2 V_n^2}{4} \int_0^{\infty} t^2 e^{-at} dt = \frac{V_n^2}{16a} \qquad (15)$$

For comparison, if the voltage at the input terminals of branch #2 had been applied to both sets of input terminals of the product detector, the output would have been $$\text{Noise D.C.} = \int_0^{\infty} V_{55}^2 dt = \frac{V_n^2 a^4}{4} \int_0^{\infty} t^4 e^{-2at} \cos^2 \omega_0 t dt$$

$$= \frac{V_n^2 a^4}{4} \cdot \frac{24}{64a^5} = \frac{3V_n^2}{32a} \qquad (16)$$

Comparing Equations 15 and 16, it is seen that the delay introduced by circuits 54 and 55 reduces the D. C. contribution due to noise by 33% without affecting that produced by the signal. Obviously, the more circuits included between terminals T1 and terminals T2 the more is the effect of noise reduced. When the input terminals of branch #1 are connected near the input of a multistage intermediate frequency amplifier with multiple tuned circuits and the input terminals of branch #2 are connected near the output, a very large increase in the noise tolerance of the system can be achieved.

Figures 9, 10:
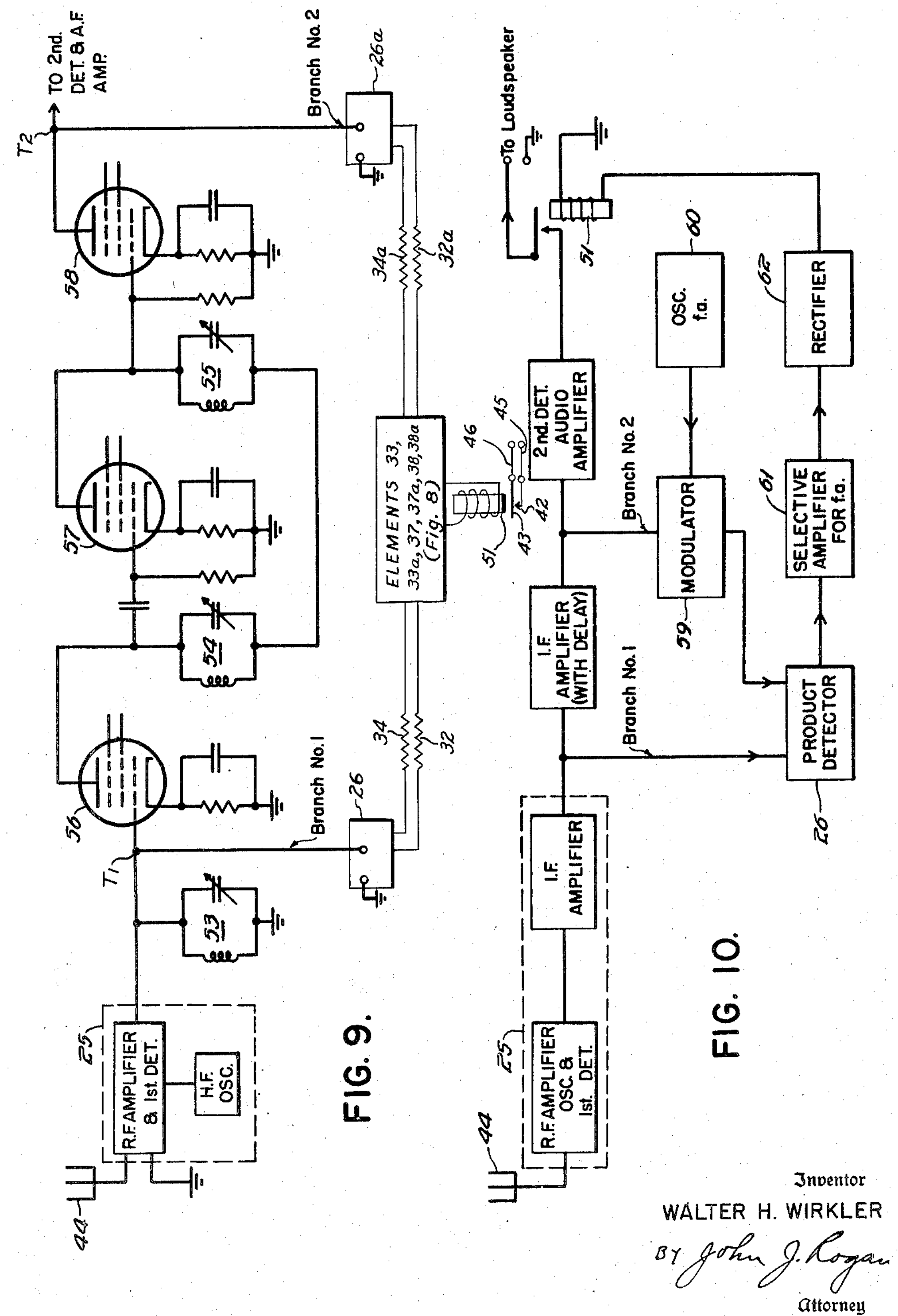
Fig. 9 is a diagram of an arrangement according to the invention and explanatory of certain phases of its operation.
Figs. 10 and 11 are further modified embodiments of the invention.

A practical application of the principles illustrated in Fig. 9, is shown in Fig. 10.

Because it is desirable to include most of the intermediate frequency amplifier between the points which feed the product detector in order to get the delay required between those points, the signal in branch #1 is, in practice, rather weak and the output of product detector 26 is weak also. If the useful output of 26 were direct current, a carefully balanced high-gain D. C. amplifier would be required for operating the relay. To avoid this, the signal in branch #2 is modulated by modulator 59 at the frequency *fa* as controlled by oscillator 60. 59 may vary the intensity or phase of the signal in branch #2, or, if it is a balanced modulator, it may actually reverse the phase periodically. In either case, the output of 26 will be alternating current and can more easily be amplified by amplifier 61, the output of which is rectified by rectifier 62 and used to operate the D. C. relay 51. Only steady signal energy at the input of 26 results in A. C. output of frequency *fa.* The noise rejection function of D. C. filter 32, 33, 34 of Fig. 5, is now performed by the selectivity of amplifier 61. When relay 51 is operated, it connects the amplified signal from the second detector and audio frequency amplifier stage of the receiver to a suitable loudspeaker, as indicated.

Figure 11:
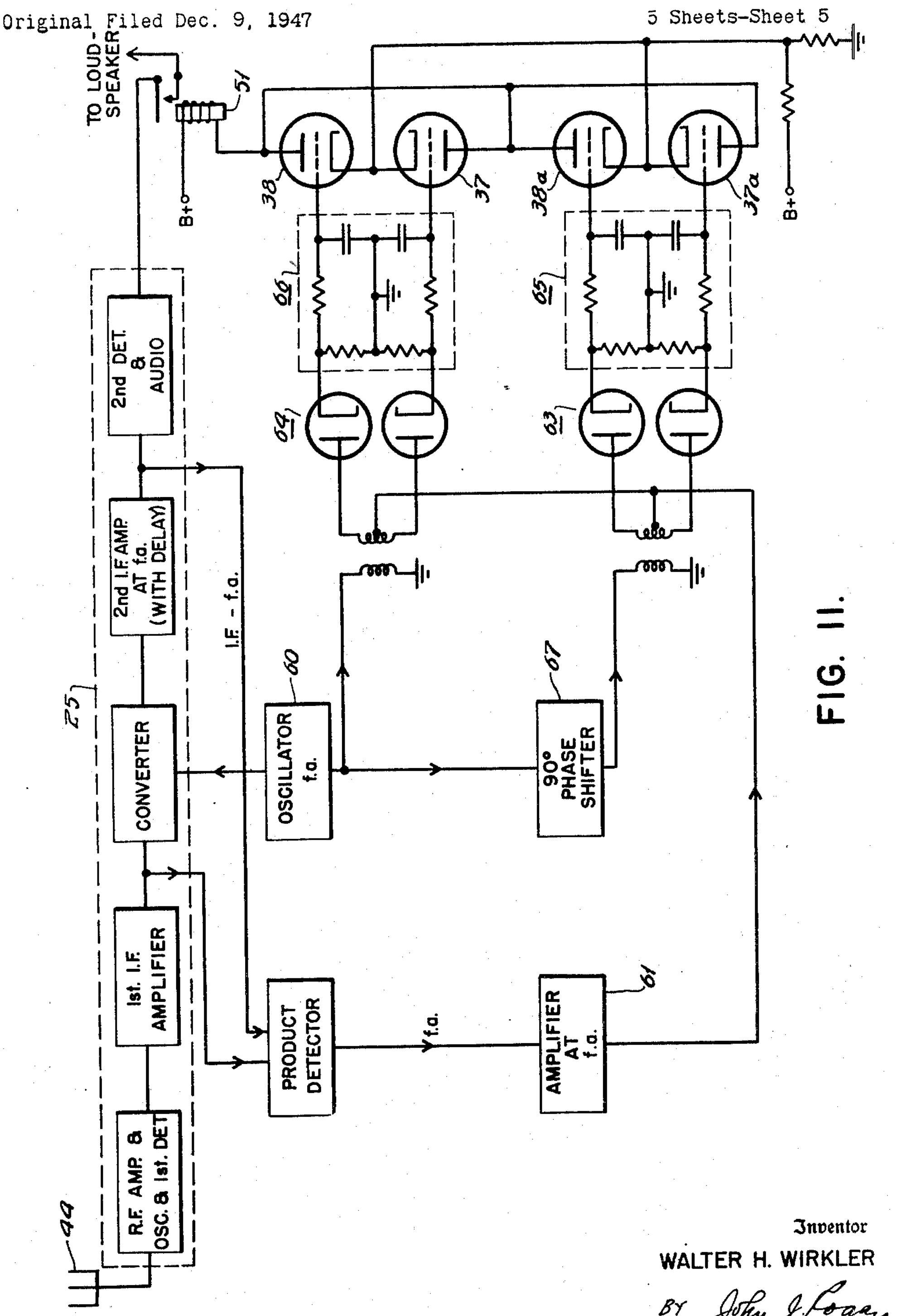

The output of 26 will still be zero, however, for signals of such frequency as to make $\omega_{s}d=0$; that is, when the two intermediate frequency input signals to 26 are in phase quadrature. To prevent this, the phase of the signal in branch #2 with respect to that in branch #1 can be caused to rotate continuously at a rate of *fa* cycles per second, rather than merely reversing periodically. This is equivalent to heterodyning the signal to a new frequency removed from the original intermediate frequency by *fa* cycles per second which arrangement is shown in Fig. 11.

Since the output of the product detector of frequency *fa* due to the presence of signal is now never zero regardless of the signal frequency and the delay, but merely changes in phase, it could be utilized directly in a highly selective amplifier and rectifier arrangement as in Fig. 10. However, a more practical arrangement is presented in Fig. 11. Here the function of amplifier 61 is merely to provide amplification. The equivalent of selectivity is provided by balanced rectifiers 63 and 64 and their R=C output filters 65, 66. Both 63 and 64 receive components of frequency *fa* derived from the signal. 64 is polarized by oscillator 60 directly, and 63 is polarized through 90° phase shifting network 67. Hence, whenever there are components of frequency exactly equal to *fa* in the output of 61, there will be direct current in the output of at least one of the rectifiers 63 and 64 regardless of the phase relation between these components and the voltage from oscillator 60. The two rectifiers 63, 64, then energize the control relay 51 cooperatively by some means such as explained in Figs. 6, 7 and 8, for example. When relay 51 is operated, it connects the detected and amplified audio frequency signal from the radio receiver 25 to the loudspeaker. Receiver 25 may be of the conventional super-heterodyne type comprising radio frequency input stage with its associated heterodyne local oscillator and first detector; first intermediate frequency amplifier stage; converter stage; second intermediate frequency amplifier stage; second detector and audio frequency amplifier stages. A system such as shown in Fig. 11 was found to be practical and reliable for carrier controlled audio muting under extreme noise conditions.

While in the foregoing certain particular embodiments have been illustrated, it will be understood that various changes and modifications will be made therein. Thus, while there is no particular criterion as to the duration of the intelligence signal voltage with respect to the delay time of the various delay circuits, they should, to produce the best results, be of a duration which is long compared with the delay time of the delay circuit. Preferably, the circuit band-width must be wide enough so that individual noise impulses are of short duration compared to the delay time of the delay circuits. However, if the spacing of these individual noise impulses is random, they may overlap with the signal intelligence. In that case, the noise output of the system is not zero, but of random polarity so that it can be filtered out in a long time constant filter circuit such as (filters 4, 32—33—34, 54—55) which will also filter out an audio signal as described. It should be observed that elements of the various figures which are the same are identified by the same numerals.

This application is a division of application Serial No. 790,501, filed December 9, 1947, now Patent No. 2,580,148 issued December 25, 1951.

What is claimed is:

1. A carrier radio receiving system, comprising a product detector of the kind having two input terminals and an output terminal and which requires simultaneous signal energization of both input terminals in order to produce a signal output at said output terminal, two input paths of respectively different time delays and connected respectively to the said input terminals of said detector to said detector, an output path from the output terminal of said detector, means to subject a received carrier to first and second frequency conversion stages, means connecting a part of the output of the first stage to one of said input paths, means connecting a part of the output of the second stage to the other input path, a local injection oscillator of fixed phase for said second stage, a pair of rectifying channels connected in parallel to said output path, means to excite both said rectifying channels from said local injection oscillator but in respective phase quadrature relation, and means connected to said rectifying channels to separate the direct current components representing the carrier signal from the alternating current components representing the noise voltages.

2. A system according to claim 1, in which said product detector comprises a pair of rectifiers with their electrodes connected in respective opposed balanced relation to both of said input paths.

3. A system according to claim 1, in which said product detector comprises a ring rectifier having two sets of conjugate points, one set being connected across one input path, and the other set being connected across the other input path.

4. A system according to claim 1, in which said product detector comprises, an electron discharge tube having a cathode, an anode and at least two successive intervening control grids one of said control grids being connected to one of said input paths and the other control grid being connected to the other of said input paths.

5. A circuit arrangement comprising a radio receiver of the superheterodyne type having an intermediate frequency amplifier stage, a signal detector, audio frequency amplifier and signal responder; switching means for controlling the circuit of said responder, a product detector of the kind having a pair of input terminals and an output terminal and which requires simultaneous signal energization of both input terminals in order to produce an output signal at the output terminal, a pair of paths leading from the output of said intermediate frequency amplifier stage respectively to input terminals of said product detector, one of said paths including transmission time delay means, and frequency conversion means connected to said one path for converting the signal supplied therefrom to said product detector to a frequency which is different from that of the signal applied to said product detector over the other path to produce in the output of said product detector a signal of fixed frequency, an amplifier connected to the output of said product detector for selectively amplifying said fixed frequency, and means to control said switching means by the output of said amplifier, the last mentioned means including a pair of rectifier channels, a local source of fixed frequency, a phase shifter for biasing said rectifiers respectively in a phase quadrature relation, means connecting the oscillator directly to one of said rectifier channels and through said phase shifter to the other of said rectifier channels, means connecting the output of said amplifier simultaneously to the inputs of both of said rectifier channels, and means connecting the outputs of said rectifier channels to said switching means.

6. A carrier radio receiving system comprising in combination, a product detector of the kind having two input terminals and an output terminal and which requires simultaneous signal energization of both input terminals in order to produce a signal at the output terminal, two separate input paths connected respectively to said input terminals, an output path from said output terminal, a pair of rectifiers, a source of fixed frequency connected through phase splitting means to said rectifiers to polarize said rectifiers respectively in phase quadrature relation, means in one of said input paths for imparting thereto a greater time delay than that of the other input path, means to apply received signals accompanied by noise voltages simultaneously to both said input paths, means including said source of fixed frequency and connected to said one of said paths to produce in the output of said product detector a carrier frequency equal to the frequency of said fixed frequency source, means to apply said carrier frequency from the output of said detector simultaneously to both rectifiers, and means connected to the output of said rectifiers to separate the direct current components representing the carrier signal from alternating current components representing noise voltages.

7. A circuit responsive to a steady signal and relatively non-responsive to random noise comprising in combination, a first product detector, two input paths to said first product detector and one output path from said first product detector, time delay means in one of said input paths, frequency conversion means for translating the signal in one input path to a frequency removed from that of the signal in the other input path by a frequency interval equal to a fixed frequency, a local oscillator for producing said fixed frequency, a second product detector, a third product detector each of said product detectors having two input paths and one output path, and each of said product detectors being of the kind which requires simultaneous signal energization of both its input paths in order to produce an output signal in the output path thereof, means to energize one input path of the said first product detector by energy from said local oscillator, means to energize one input path of the third product detector also by said fixed frequency energy but in phase quadrature with the energy energizing the said input path of the second product detector by said fixed frequency, the remaining input paths of the second and third product detectors being connected to the output path of the first product detector, separate filter means connected to the output paths of the second and third product detectors for accepting unidirectional currents and rejecting alternating currents, and means for combining the effects of the two filtered currents additively regardless of their relative polarities.

References Cited in the file of this patent

UNITED STATES PATENTS

| | | |
|---|---|---|
| 1,904,607 | Bethenod | Apr. 18, 1933 |
| 2,165,764 | Pitsch | July 11, 1939 |
| 2,175,270 | Koch | Oct. 10, 1939 |
| 2,233,384 | Feldman | Feb. 25, 1941 |
| 2,252,811 | Lowell | Aug. 19, 1941 |
| 2,290,958 | Hagen | July 28, 1942 |
| 2,304,135 | Eidr | Dec. 8, 1942 |
| 2,344,012 | Wright | Mar. 14, 1944 |
| 2,350,702 | Ullrich | June 6, 1944 |
| 2,371,416 | Tunick | Mar. 13, 1945 |
| 2,426,187 | Earp | Aug. 26, 1947 |
| 2,493,446 | Crosby | Jan. 3, 1950 |
| 2,527,561 | Mayle | Oct. 31, 1950 |

OTHER REFERENCES

Belles: "Reduction of Heterodyne Interference," pages 150 and 151, in Electronics, December 1945.